United States Patent
Brooker

(10) Patent No.: US 9,596,263 B1
(45) Date of Patent: Mar. 14, 2017

(54) OBFUSCATION AND DE-OBFUSCATION OF IDENTIFIERS

(71) Applicant: Amazon Technologies, Inc., Seattle, WA (US)

(72) Inventor: Marc John Brooker, Seattle, WA (US)

(73) Assignee: Amazon Technolgies, Inc., Seattle, WA (US)

( * ) Notice: Subject to any disclaimer, the term of this patent is extended or adjusted under 35 U.S.C. 154(b) by 0 days.

(21) Appl. No.: 14/629,281

(22) Filed: Feb. 23, 2015

(51) Int. Cl.
  H04L 29/06 (2006.01)
(52) U.S. Cl.
  CPC ...... H04L 63/1458 (2013.01); H04L 63/0407 (2013.01); H04L 63/0428 (2013.01)
(58) Field of Classification Search
  CPC .................................................. H04L 63/0407
  See application file for complete search history.

(56) References Cited

U.S. PATENT DOCUMENTS

| | | | | |
|---|---|---|---|---|
| 8,595,490 B2 * | 11/2013 | von Mueller | ........ | G06Q 20/085 705/35 |
| 2005/0277405 A1 * | 12/2005 | Noguchi | ............ | H04N 1/00127 455/411 |
| 2011/0091038 A1 * | 4/2011 | Thueringer | .............. | G06F 21/35 380/255 |
| 2011/0310822 A1 * | 12/2011 | Nair | ........................ | H04W 8/26 370/329 |
| 2012/0039469 A1 * | 2/2012 | Mueller | ................. | G06Q 20/12 380/252 |
| 2013/0061036 A1 * | 3/2013 | Oliver | ..................... | G06F 21/73 713/150 |
| 2013/0212704 A1 * | 8/2013 | Shablygin | ........... | G06F 21/6218 726/28 |
| 2014/0150086 A1 * | 5/2014 | Horst | .................. | H04L 63/0471 726/18 |
| 2015/0032569 A1 * | 1/2015 | Stromberg | ......... | G06K 7/10009 705/26.35 |
| 2015/0095641 A1 * | 4/2015 | Drewry | ................. | H04L 9/3268 713/158 |
| 2015/0365551 A1 * | 12/2015 | Panuganti | .......... | H04N 1/00244 358/1.15 |

OTHER PUBLICATIONS

"Identification cards—Identification of issuers—Part 1: Numbering system," International Organization for Standardization/International Electrotechnical Commission ISO/IEC 7812-1:2006(E), Oct. 15, 2006, 12 pages.
"Identification cards—Identification of issuers—Part 2: Application and registration procedures," International Organization for Standardization/International Electrotechnical Commission ISO/IEC 7812-2:2007(E), May 1, 2007, 30 pages.

(Continued)

*Primary Examiner* — Jason C Chiang
(74) *Attorney, Agent, or Firm* — Davis Wright Tremaine LLP

(57) ABSTRACT

A service allowing for obfuscation of identifiers such that the obfuscated identifier values are within a set of valid identifier values. The service allows for resources to be associated with an obfuscated identifier, and for clients to request information regarding obfuscated identifiers and resources associated to obfuscated identifiers.

20 Claims, 10 Drawing Sheets

(56) References Cited

OTHER PUBLICATIONS

Dworkin, M., "Recommendation for Block Cipher Modes of Operation: Methods for Format-Preserving Encryption," NIST Special Publication 800-38G Draft, Jul. 2013, 30 pages.

Bellare, M. et al., "The FFX Mode of Operation for Format-Preserving Encryption," Specification Draft 1.1, Feb. 20, 2010, 18 pages.

"TPM Main: Part 1 Design Principles—Specification Version 1.2—Level 2 Revision 103," Trusted Computing Group, Inc., Jul. 9, 2007, 182 pages.

"TPM Main: Part 2 TPM Structures—Specification Version 1.2—Level 2 Revision 103," Trusted Computing Group, Inc., Jul. 9, 2007, 198 pages.

"TPM Main: Part 3 Commands—Specification Version 1.2—Level 2 Revision 103," Trusted Computing Group, Inc., Jul. 9, 2007, 330 pages.

"TPM Main: Part 1 Design Principles—Specification Version 1.2—Revision 116," Trusted Computing Group, Inc., Mar. 1, 2011, 184 pages.

"TPM Main: Part 2 TPM Structures—Specification Version 1.2—Revision 116," Trusted Computing Group, Inc., Mar. 1, 2011, 201 pages.

"TPM Main: Part 3 Commands—Specification Version 1.2—Revision 116," Trusted Computing Group, Inc., Mar. 1, 2011, 339 pages.

"Information technology—Trusted Platform Module—Part 1: Overview," International Organization for Standardization/International Electrotechnical Commission ISO/IEC 11889-1:2009(E), May 15, 2009, 20 pages.

"Information technology—Trusted Platform Module—Part 2: Design principles," International Organization for Standardization/International Electrotechnical Commission ISO/IEC 11889-2:2009(E), May 15, 2009, 152 pages.

"Information technology—Trusted Platform Module—Part 3: Structures," International Organization for Standardization/International Electrotechnical Commission ISO/IEC 11889-3:2009(E), May 15, 2009, 204 pages.

"Information technology—Trusted Platform Module—Part 4: Commands," International Organization for Standardization/International Electrotechnical Commission ISO/IEC 11889-4:2009(E), May 15, 2009, 254 pages.

\* cited by examiner

OBFUSCATION AND DE-OBFUSCATION OF IDENTIFIERS

BACKGROUND

Computing resource service providers and other large-scale users of computing resources often utilize configurable and scalable computing resources to meet various types of computing needs. A computing resource service provider, for example, is designed to share large amounts of computing resources and can be distributed among a large number of users, and may include multiple computing components configured to store and access data. Resources within a computing resource service provider may be assigned identifiers to distinguish the resources from one another.

Depending on how they are constructed, identifiers can result in various issues. For example, sequential assignment of identifiers may provide information about a distributed system (e.g., information regarding various characteristics of the distributed system) that is otherwise intended to be non-public. As a second example, a malicious user may use identifier values to learn about a system for malicious reasons, such as denial of service (DOS) or distributed denial of service (DDOS) attacks. Furthermore, identifiers can often be longer than necessary, causing unnecessary use of space on a display and other adverse effects on user experience.

BRIEF DESCRIPTION OF THE DRAWINGS

Various embodiments in accordance with the present disclosure will be described with reference to the drawings, in which.

DETAILED DESCRIPTION

Figure 1:
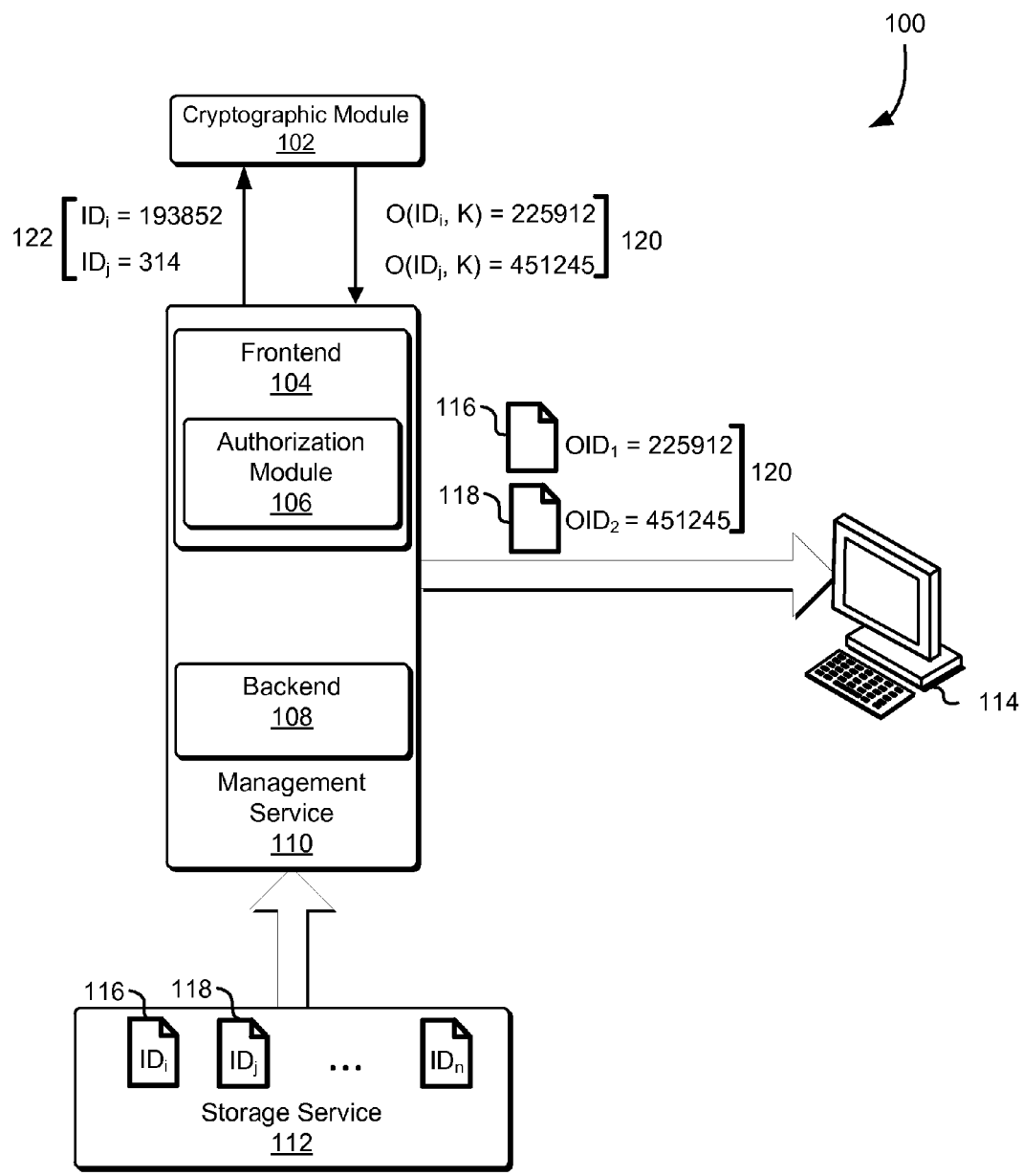
FIG. 1 illustrates an environment in which obfuscated identifiers for computing resources are provided to a client.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include generating custom-length obfuscated identifiers that may be used in various contexts. Identifiers may be used in many contexts and many purposes. For example, an identifier may be used to identify, define, or specify a computing resource such as hardware (e.g., a computer, a router, a storage device), a network (e.g., a local area network, an intranet), a user account, a virtual machine instance, a computer file, a storage drive (e.g., a hard disk drive, a network drive), or any combination thereof. In many instances, the identifier may be presented to a human—for example, a user or an administrator of the computing resources. In many instances, it is preferable to present to humans identifiers that are shorter rather than longer for various reasons, such as memory retention (humans, generally, may remember shorter identifiers as compared to longer identifiers), customer experience (e.g., more data may be presented via a computer screen when shorter identifiers are used compared to longer identifiers), and physical consideration (e.g., a human may need to copy down an identifier from a computer screen onto a piece of paper—humans, generally, may be less likely to make a mistake copying down a shorter identifier as compared to a longer identifier). However, having a short identifier may result in exhaustion of valid identifiers, after which no new identifiers may be used to uniquely map an identifier to a resource. Thus, it may be desirable to define a specific length or length range in which the identifiers are selected from. In some embodiments, the desired length may not include a number of identifiers that is a power of two (e.g., the designed length may be 47 bits). Such identifiers may provide a sufficient number to avoid exhaustion while avoiding issues resulting from excessive length.

Additionally, there may be advantages to obfuscating identifiers. Obfuscating identifiers refers to transforming identifiers to obscure information that the identifiers would otherwise provide (e.g., a sequence number) while still allowing them to be used to identify corresponding computing resources. For example, a computer system may assign identifiers to users when they create a user account, starting from an initial value (e.g., the first user may be assigned an identifier (ID) of value 0) and increment the value when a second user account is created (e.g., the second user account may be assigned an ID value of 1, the third user account assigned an ID value of 2 ... the N-th user account assigned an ID value of N−1). Additionally, such a system may make the user ID available to the user, for example, through the user's account settings, through an application programming interface (API), metadata associated with the user, etc. In some computer systems, obfuscating identifiers may involve transforming an identifier in a manner that renders the identifier less usable to obtain information about a system. In the previous example, obfuscating an identifier may include performing a transformation on the sequentially assigned IDs such that the result of the transformation is a value that is not easily associated with the original, un-obfuscated identifier.

In such a system, it may be possible to use the ID to determine properties of the system. For example, in the system previously described, it is possible to determine the number of user accounts created by creating an account and inspecting the user ID. In some systems, it may be beneficial to make it harder to determine information regarding the system (in this case, the number of users created in the system, which may, also in some instances, be the number of users in the system). In such a system, a competitor may create a new user account and use the ID associated with the new user account to determine an estimate of the number of users on the system. This information may, for example, be used to determine the scale of business being done on a website.

Obfuscating identifiers may be performed by a computer system or a set of computer systems, such as a server or multiple servers, that includes a frontend, a backend, and computing resources that can be made available (e.g., computer files). The server(s) may include a management service that is responsible for obfuscation of identifiers. In some embodiments, the management service may contain a frontend including an authorization module and a backend. The management service may further have access to a cryptographic module that may be an additional component within the server and/or management service, or may be separate and communicatively accessible by the management service (e.g., over a network). The computing system may further include computing resources such as compute instances, storage space, and user accounts that are associated with identifiers. Identifiers may map uniquely to a resource (that is, a resource specifies a single resource) or may map to a set of redundant resources (e.g., in a distributed system, an identifier may map to any of the redundant copies of a resource).

In some embodiments, the management service may create and/or assign identifiers in a manner that is un-obfuscated. The management service may further, or instead, be configured to receive identifiers. When the management service has obtained an identifier, it may use a cryptographic module to perform an encryption operation on the identifier, thereby obfuscating it. For example, identifiers may be created or assigned sequentially.

Obfuscation of the identifier may be done using various methods. For example, a cryptographic module may be used to obfuscate an identifier by performing an encryption operation using at least the identifier as a plaintext input and a cryptographic key in conjunction with an encryption algorithm.

In some embodiments, the identifier is selected from a pre-defined set of valid identifier values. The pre-defined set of valid identifiers may be defined based on various properties of the identifiers, allowing for greater flexibility and customization of allowable identifier values. For example, the pre-defined set of valid identifier values may include all integers between 0 and $2^{45}-1$ (inclusive)—in such a pre-defined set, exactly 45 bits is sufficient to represent every valid identifier value, and exactly 45 bits is required to represent some values in the pre-defined set without zero-padding. Zero-padding refers to a technique for expanding a number out to fill a certain number of bits. For example, the decimal number "123" may be zero-padded to a 16-bit binary number by representing it as $0000000001111011_2$ (that is, 0000000001111011 base-2) whereas 123 may also be represented by the seven-bit binary number $1111011_2$ without zero-padding. As a second example of a pre-defined set of valid identifier values, the pre-defined set may include all integers between 1 and 1,000—such a pre-defined set may be represented in a computer using 10 bits. In some embodiments, the pre-defined set of valid identifier values may only include identifiers that meet certain requirements. As an example, a pre-defined set of identifiers may consist of 16-digit decimal numbers wherein the identifiers in the pre-defined set must be valid credit card numbers. In each example, identifiers in the pre-defined set of valid identifier values may be represented by a number of bits is not an integer power of 2 (e.g., 32 bits, 64 bits, 128 bits, and so on). In some embodiments, the pre-defined set may be defined based on a rule (e.g., all integers between 0 and $2^{45}-1$ inclusive) or may be explicitly defined (e.g., by a vector containing all values belonging to the set).

Returning to the example provided above, the pre-defined set of valid identifier values that includes all integers between 0 and $2^{45}-1$ (inclusive) may be represented by 45 bits. The obfuscated identifiers, which may be generated through an encryption operation, may also be a value within the pre-defined set—in this example, the obfuscated identifier will also be a number that is representable by 45 bits. In some embodiments, the encryption operation may result in the obfuscated identifier and resource identifier having the same value. In such a system, the obfuscated identifier is no longer than the longest identifier from the pre-defined set of valid identifier values.

The obfuscated identifier may be generated using various methods. For example, the obfuscated identifier may be generated using a variable-block-size block cipher algorithm configured to have a block-size equal to the length of the identifier. Continuing with the previous example where the pre-defined set of valid identifier values includes all integers between 0 and $2^{45}-1$ (inclusive), the block-size will be configured to 45 bits. Examples of variable-block-size block cipher algorithms include Hasty Pudding Cipher.

However, it may be desirable to use fixed-block-size block cipher algorithms such as Advanced Encryption Standard (AES) because its cryptographic properties have been widely studied and well understood. In some embodiments, a custom-length block cipher may be constructed from a fixed block size to match the identifier length. In the example previously provided where the pre-defined set of values includes all integers between 0 and $2^{45}-1$ inclusive, a 32-bit block cipher may be used to construct a 45-bit block cipher. It should be noted that in many embodiments, a block cipher may be used to construct a custom-length block cipher that is not an integer multiple in size (e.g., a 32-bit block cipher may be used to generate block ciphers that are not 64-bits, 128-bits, etc. in size).

Identifiers (and, by association, obfuscated identifiers) may be associated with computing resources. Computing resources may include user accounts, databases, storage devices, computing resources, computer files, tokens, computer tasks, and other types of computer resources which it may be advantageous to uniquely identify. In several of these categories, the identifier may be associated to hardware, software, or a combination of both for example, computing resources may refer to a physical server or computer machine, but may also refer to a purely software-based virtual machine instance (VMI) capable of performing computing operations, a hypervisor including both hardware and software, and other similar configurations including the use of hardware, software, or a combination of both.

Upon generation of an obfuscated identifier, the obfuscated identifier may be made available, for example, to a client. In some embodiments, additional data or information related to the underlying resource associated to the identifier may also be presented. For example, in a cloud computing platform, a client issues a task to the cloud computing platform and, after issuance of the task, request information about which compute instance is running the task. For simplicity, the platform may assign identifiers to compute instances sequentially, but may wish to obfuscate that information to the client—for example, to prevent clients from probabilistically estimating the number of compute instances. Where compute instances are numbered sequentially (e.g., starting from 1, 2, 3 . . . N) and tasks are distributed in a nondeterministic manner across those compute instances, it is possible to estimate N, the total number of compute instances, through successively issuing tasks. The platform may wish to keep the total number of compute instances a secret from the client, for example, as a precaution against malicious users that may attempt to perform a DOS/DDOS attack against the platform. Thus, an obfuscated identifier may be provided to the client, as well as any other data or metadata that is needed by the client.

FIG. 1 illustrates an environment in which various embodiments can be implemented. The computing environment 100 illustrates a management service 110 configurable to make available obfuscated identifiers and/or resources such as user accounts, data stores, processing power, tokens, files, and more. In the embodiment show in FIG. 1, data files 116 and 118 are resources that the management service may make available, for example, in response to a request by a client 114. In some embodiments, the management service 110 may be software, hardware, or a combination thereof on one or more computer systems—for example, in a distributed computing system capable of servicing one or more clients 114. Clients may be any entity operable to access the management service, and may also include internal clients. An example embodiment in accordance with the present disclosure includes one or more customers of a distributed system.

The management service 110 may include or have access to components, modules, libraries, or other executable code that operates as a frontend 104 and backend 108. In some embodiments, the frontend 104 may comprise executable code, software components, hardware components, or any combination thereof that is distributed among one or more computer systems, for example in a distributed system. An example frontend 104 may be a web server operable to receive API requests or a fleet of web servers operable to receive API requests. In an embodiment, a service frontend 104 receives a request from one or more clients and communicates with an authorization module 106 to determine how to process the request. The authorization module 106 may be a computer system, computer system process, program application, service module, or a combination of these and/or other such computing system entities. The authorization module 106 may be utilized by the management service 110 to determine whether and/or how to process requests submitted to the frontend 104. The authorization module 106 may, for instance, verify digital signatures of requests submitted to the cryptography service or otherwise may determine whether fulfillment of requests is authorized. Further, while a customer/provider relationship is discussed throughout the present disclosure for the purpose of illustration, the techniques described herein are adaptable to other contexts, such as when the customer is an internal customer of the management service 110.

The management service 110 may further be configured to use a cryptographic module 102 for obfuscation and de-obfuscation of identifiers. The cryptographic module 102 may be any component (e.g., a program module) operable to perform cryptographic operations such as encryption and decryption. The cryptographic module may be implemented as hardware, software, or a combination thereof. In some embodiments, the cryptographic module is a program module executing inside of a security module, such as a Hardware Security Module (HSM). In some embodiments, the management service 110 may access the security module 102 indirectly via a cryptography service (not shown in FIG. 1). For example, the cryptography service may have a secure connection (e.g., a Transport Layer Security (TLS) connection and/or a virtual private network (VPN) connection) to access a cryptographic module located on a remote server.

The frontend 104 may further be configured to communicate with a backend 108 system that is operable to access additional components and/or data, such as a cryptography service (not shown in FIG. 2), storage service 112, computing services (not shown in FIG. 2), or other suitable systems for fulfilling requests received by the frontend 104. The backend 108 may comprise executable code, software components hardware components, or any combination thereof that is distributed among one or more computer systems, for example in a distributed system. An example backend 108 is a server program operable to access a database or storage server within a server network. In some embodiments, the frontend 104 and backend 108 may be implemented at least in part on additional services that are distinct from the management service 110—in such embodiments, the frontend 104 and/or backend 108 may communicate with the management service, for example, via a secure TLS connection.

Figure 2:
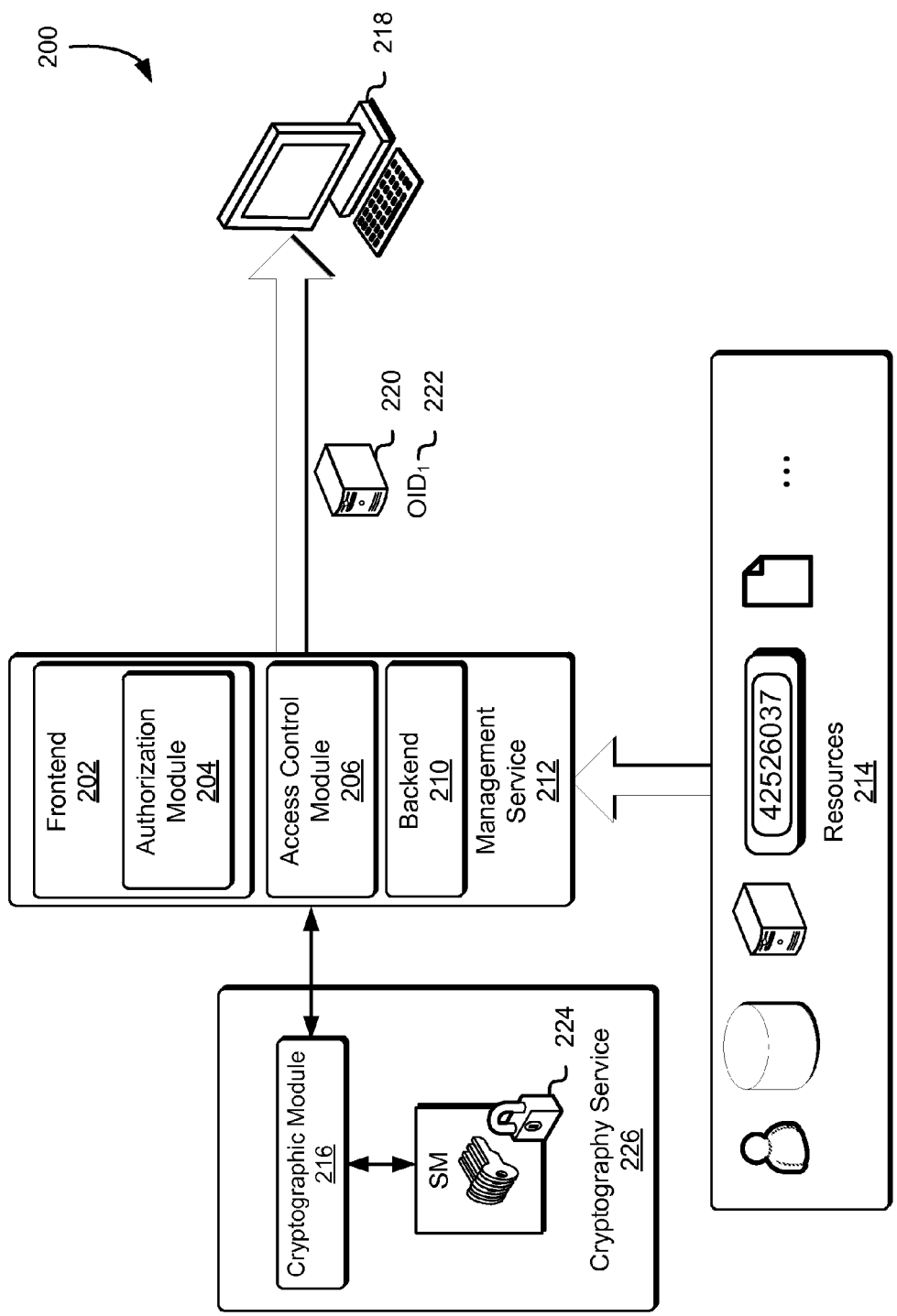
FIG. 2 illustrates an environment in which various embodiments can be implemented.

The storage service 112 may be hardware, software, or a combination thereof that is used to access data that may be persisted in any suitable computer readable medium including hard disk drives and tape drives. It should be noted that some data accessible from a storage service is not necessarily stored in a persistent-storage medium. For example, some storage systems may use volatile memory to store data. In FIG. 2, the storage service includes several data files with identifiers $ID_i$, $ID_j$, . . . $ID_n$. Each of these data files is associated with an identifier within the environment 100, and the identifier may be used within the environment 100 to obtain the data file resource. In the embodiment shown in FIG. 1, data file 116 has an identifier $ID_i$ value of 193852 and data file 118 has an identifier $ID_j$ value of 314.

The embodiment shown in FIG. 1 illustrates how data files 116 and 118 may be made available to a client 114. The management service, for example, in response to the frontend 104 receiving a request from the client 114, may, via the backend 108 identify the data files 116 and 118 to be made available. The identifiers 122 for data files 116 and 118, respectively $ID_i$ and $ID_j$ may be obtained by the management service, and the management service may, for example using an API, use the cryptographic module 102 to obfuscate the identifiers 112.

Identifiers may be obfuscated using an obfuscation algorithm, the output of the obfuscation algorithm including at least an obfuscated identifier (for example, obfuscated identifiers 120). The obfuscation algorithm may be achieved using a variety of methods, including at least block-cipher encryption algorithms and hash functions. The obfuscation algorithm accepts as an input at least an identifier, information usable to determine the set of valid identifier values, and produces as an output at least an obfuscated identifier.

Obfuscation of the identifier may be done using various methods. For example, a cryptographic module may be used to obfuscate an identifier by performing an encryption operation using at least the identifier as a plaintext input and a cryptographic key in conjunction with an encryption algorithm. In some embodiments, there may be additional inputs accepted, either as mandatory or optional inputs, to the encryption operation such as a nonce, initialization vector, additional authenticated data (AAD), or any combination thereof.

As a result of the encryption operation, at least a ciphertext is produced as an output. In some embodiments, as a result of the encryption operation, additional outputs may be generated, such as an authentication tag. The authentication tag may, for example, be a message authentication code (MAC) calculated by a keyed-hash message authentication code (HMAC). The ciphertext is an encoded text that is cryptographically secure, and wherein determining the plaintext from the ciphertext without access to the corresponding cryptographic key needed to perform the decryption operation is extremely difficult or impossible. The obfuscated identifier includes at least the ciphertext, and in some embodiments may also include the MAC and/or other information.

The set of valid identifier values may be expressed in various formats. In some embodiments, the set of valid identifiers may be defined by an array of alphanumeric strings. However, the set of valid identifiers may also be expressed based on certain properties shared by the set. For example, the set of valid identifier values may be expressed as a maximum length in decimal digits—for example, the set of valid identifiers includes all integers between 0 and 999,999 (inclusive) may be expressed using the maximum valid identifier value (999,999), the maximum number of decimal digits in all valid identifier values (6), or any other suitable representation for expressing such a numerical set. Of course, this set of valid identifiers may also be expressed as an array of numbers. The embodiment shown in FIG. 1 illustrates an environment 100 wherein the set of valid identifiers includes all 6 digit decimal numbers.

As a second example, the set of valid identifier values may be expressed as a maximum length in binary digits—for example, the set of valid identifiers includes all binary numbers between 0 and $11111111_2$ (i.e., 11111111 base-2, or 255 base-10) (inclusive) may be expressed using the maximum valid identifier value ($11111111_2$ or 255), the maximum number of binary digits in all valid identifier values (8), or any other suitable representation for expressing such a set. Of course, this set of valid identifiers may also be expressed as an array of binary digits and/or decimal numbers. Of course maximum lengths may also be expressed in other numeral systems including hexademical (base-16 numeral system) and ternary (base-3 numeral system).

In some embodiments, a maximum length may be used, for example, to ensure that identifiers displayed to a user, for example, in an end-user console displayed on a computer monitor, does not exceed a certain length. Customers may find such a maximum length helpful, for example, in being able to display several identifiers on an end-user console, in copying the identifiers by hand, or for memorization.

Furthermore, the set of valid identifiers may, in some embodiments, require valid identifiers to possess certain properties. For example, a set of valid identifiers may include 16-digit numbers in accordance with the ISO/IEC 7812 standard which is incorporated into this document by reference.

Turning back to the illustrative embodiment shown in FIG. 1, the obfuscated identifiers 120 are produced by the cryptographic module 102 to be within the set of valid identifiers. In some embodiments, the cryptographic module uses an obfuscation algorithm to map the identifier values 112 to other values 120 in the set of valid identifiers. Note that although the embodiment shown in FIG. 1 shows two identifiers being obfuscated, that identifiers may be obfuscated individually (e.g., one identifier is obfuscated at a time) or may also be obfuscated in batches (e.g., a set of identifiers is provided for obfuscation).

In some embodiments, an identifier value may map onto itself (i.e., the obfuscated identifier has the same value as the identifier). The mapping may be achieved in various ways. For example, a hashing function may be used to map an identifier value to a hashed value that corresponds to an identifier within the set of valid identifiers. As another example, a format-preserving encryption algorithm may be used to ensure that the desired output format is preserved. Format-preserving encryption algorithms may use a variety of ways to ensure that the output obfuscated identifier is within the set of valid identifier values. Feistel networks, including at least unbalanced Feistel networks, may be used to construct custom-length block ciphers from block ciphers that are not an integer multiple. As an example, format-preserving algorithms such as implementations of AES-FFX in accordance with NIST 800-38G, which is incorporated herein by reference, may be used. Format-preserving encryption algorithms may also be implemented at least in part by using a prefix cipher and/or cycle walking.

In the embodiment illustrated in FIG. 1, the identifier values 193852 and 314 map respectively to obfuscated identifier values 225912 and 451245. The obfuscated identifiers 120 are made available to the management service 110, for example, as part of a request response, and may be provided back to the client 114 along with the data files 116 and 118 associated with the obfuscated identifiers 120. Note that in some embodiments the data file and/or corresponding obfuscated identifier may not be made available as a pair in the manner shown in FIG. 1. Rather, in some embodiments, it may be sufficient or even desirable for the management service 110 to make only the resource (e.g., data file) or obfuscated identifier alone available to the client 114. In some embodiments, obfuscated identifiers and a reference to the corresponding resource is made available to the client 114, wherein a reference to the corresponding resource may be in the form of an IP address, URL, uniform resource identifier (URI) or other information usable to identify the resource.

In the embodiment illustrated in FIG. 1, the client 114 receives both the data files 116 and 118, and the obfuscated identifiers 120 corresponding to the data files. The client 114 may use the data file or other resource types along with the resource's corresponding obfuscated identifier to perform operations that would otherwise be performable having both the resource and identifier.

FIG. 2 illustrates an environment in which various embodiments can be implemented. The computing environment 200 illustrates a management service 212 configurable to make available obfuscated identifiers and/or resources such as user accounts, data stores, processing power, tokens, files, and more. The management service 212 may include additional components such as a service frontend 202 including an authorization module 204, a service backend 210, and an access control module. The management service 212 may also have access to computing resources 214. The management service 212 may further be operable to use a cryptographic module 216 that is connected to a security module 224. Components described in FIG. 2, such as the service frontend 202, authorization module 204, and backend 210 may be implemented in accordance with the respective components of the same name described in FIG. 1.

In an embodiment, the management service 212 may be configured to include a service frontend 202 operable to receive requests from a client 218 and provide a resource 220 and the resource's corresponding obfuscated identifier 222, $OID_1$. The service frontend 202 may be configured in the manner described above in FIG. 1, but may be further configured to communicate with an access control module 206 for determining how to fulfill a request (including whether to deny the request).

The cryptography service 226 may further be configured to be used by the management service 212. In an embodiment, a multi-tenant, API configurable cryptography service 226 is configured to receive requests (e.g., API requests, also referred to as API calls) from a client (e.g., an internal client such as management service 212) to perform cryptographic operations, such as decryption of encrypted data and digital signature verification. The cryptography service 226 may include a cryptographic module 216 which is used to service requests for cryptographic operations such as encryption and decryption, but may also provide additional services such as performing operations for verification of the authenticity or integrity of a message.

In some embodiments, the cryptographic module 216 may provide data to be encrypted or encrypted data to decrypt to a secure module 224. The security module 224 may be used for storing cryptographic keys and performing cryptographic operations using cryptographic keys. Examples of security modules include a hardware security module (HSM) or other device with hardware-based protection of cryptographic material (e.g., a hardware token) such as a trusted platform module (TPM) or other device configured to implement one or more services configured to implement techniques described herein. For clarity, a single security module 224 is shown in FIG. 2, but one or more security modules (e.g., a fleet of HSMs) may be used by the cryptography service.

Various resources 214 may be available to the system 200. Resources 214 include, but are not limited to, user account data, storage devices, computing instances, tokens, computer files, and computer system snapshots. In some embodiments, resources are accessed through the service backend 210, but other components may also be used to access the resources. In some embodiments, the resources may be accessed through another service—for example, a data service may be used to access data file resources. In some embodiments, computing resources may be hosted in a distributed system of a service provider for a customer of the service provider, and the computing resource from a plurality of computing resources may be hosted by the service provider for different customers. In some embodiments, information designating the resource type may be provided either as part of the obfuscated identifier or as metadata prepended, appended, or otherwise integrated into the obfuscated identifier. For example, the obfuscated identifier 222 may include the obfuscated resource identifier value and also be prepended with a short, human-readable tag denoting the resource type. As a specific example, a compute instance resource identifier having an ID value 193852 with a corresponding obfuscated value of 225912 may have an obfuscated identifier "I-225912" wherein the obfuscated identifier includes a prepended tag that identifies the resource as a compute instance and an obfuscated identifier value corresponding to the underlying compute instance. Additional tags may be associated with additional resource types (e.g., "DAT-" may be associated with data files, "SNAP-" may be associated with snapshots, and so on). Additional tags may be used in addition to or instead of resource-type tags, such as tags associated with customer identifiers, user identifiers, use identifiers, and, in some embodiments, custom defined identifiers.

User account data may be data or metadata associated with a user, username, handle, client, customer, group, etc. User account data may include, for example, a user's credit card information, the creation date of a customer's account. Internal to the service, an identifier may be associated with each user account—for example, a customer ID that is derived from an incremental counter (e.g., the first customer is assigned a customer ID of 1, the second customer is assigned a customer ID of 2, and so on).

Storage devices may include a storage-area network (SAN), disk drives, tape drives, and various other storage mediums. Computing instances may include resources that are capable of performing computer processing tasks such as physical processors, execution cores, virtual cores, logical cores, virtual machine instances, and the like. Computing instances may include hardware, software, firmware, and any combination thereof. Compute instances may further include management components operable to run such resources. For example, a compute instance may refer to a virtual machine instance, but may also refer to a compute instance and a hypervisor or virtual machine monitor used to manage the compute instance. In some embodiments, compute instances are made available through a cloud-based distributed computing platform.

As described above in connection with FIG. 1, a resource 220 and an obfuscated identifier 222 associated to the resource may be made available to a client 218. In FIG. 2, a reference to a compute instance 220 is provided with the obfuscated identifier associated to the compute instance—these may be provided, for example, as part of a response to a request to perform a computational task within a distributed computing environment.

Figure 3:
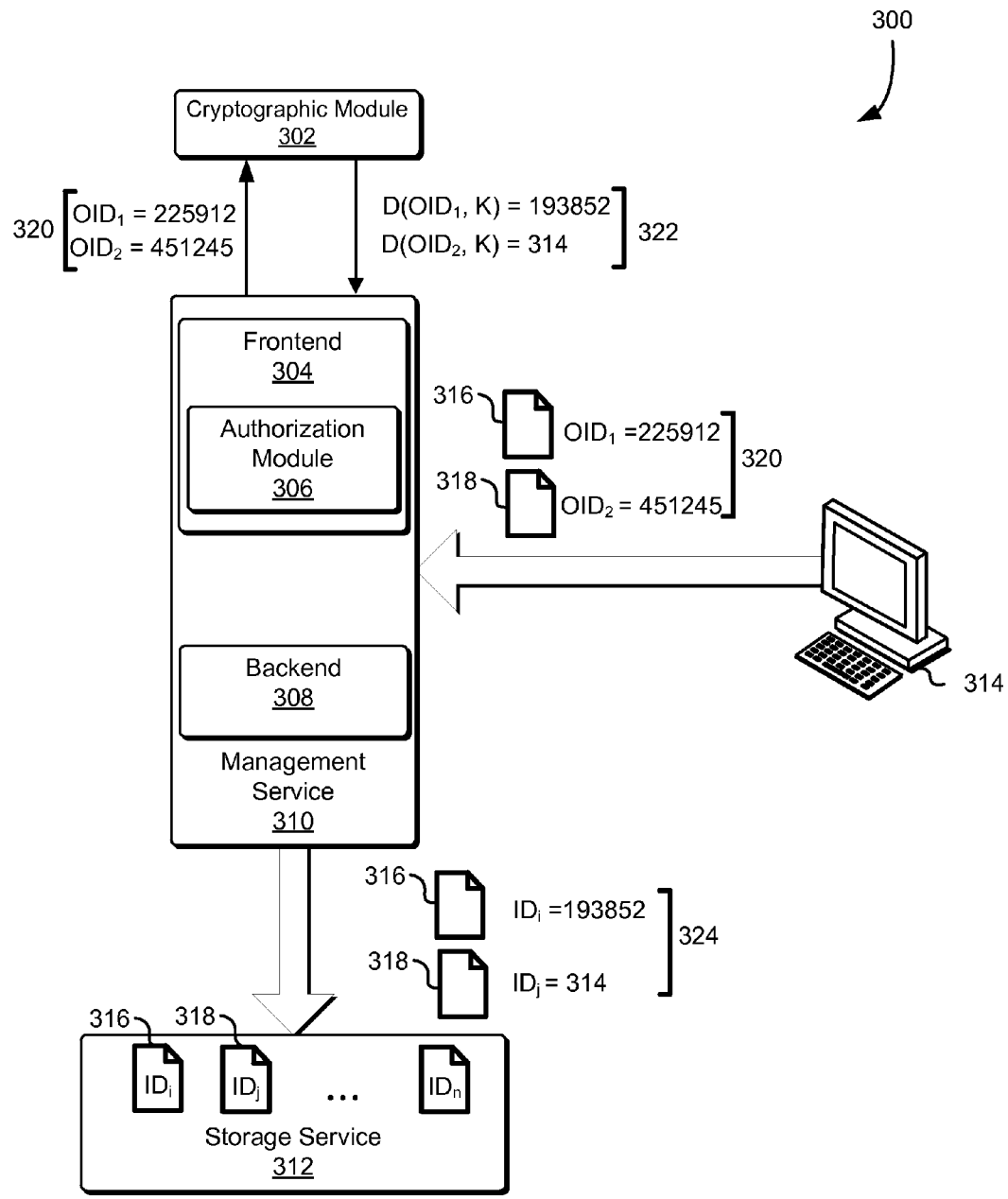
FIG. 3 illustrates an environment in which obfuscated identifiers may be de-obfuscated and associated with resources.

FIG. 3 illustrates an environment in which various embodiments can be implemented. The computing environment 300 illustrates a management service 310 configurable to receive obfuscated identifiers and/or resources and de-obfuscate the identifiers. In the embodiment show in FIG. 3, data files 316 and 318 are resources that the management service may receive, for example, where client 314 issues a request to update or modify the data files. The embodiment described in FIG. 3 may, for example, be adapted from the embodiment described in FIG. 1.

In an embodiment, the client 314 makes a request including resources 316 and 318 or references to resources in a request and obfuscated identifiers 320. For example, a client may issue a request to modify data files 316 and 318 stored on the server that are identified by obfuscated identifiers $OID_1$ and $OID_2$ respectively.

The service frontend 304 may receive the request from the client 314 and de-obfuscate (e.g., decrypt) the obfuscated identifiers 320. The frontend 304 may request for the cryptographic module 302 to perform a de-obfuscation of the obfuscated identifiers 320. In an embodiment, the obfuscated identifiers 320 may correspond to the ciphertext of the associated identifiers 322 encrypted with a cryptographic key. The identifiers 322 may have been encrypted using a symmetric-key algorithm such as AES-FFX. Continuing with the example, the cryptographic module 302 may receive the obfuscated identifiers 320 and de-obfuscate the received obfuscated identifiers by performing a decryption operation using the obfuscated identifiers 320 and the cryptographic key used to encrypt the obfuscated identifiers 320. The output of the decryption operation includes at least information usable to obtain the (de-obfuscated) identifiers 322. In this example, the obfuscated identifier $OID_1$ has a de-obfuscated identifier value of 193852 and the obfuscated identifier $OID_2$ has a de-obfuscated identifier value of 314. Various de-obfuscation algorithms may be used, including symmetric-key algorithms and reverse hash functions corresponding to the algorithm/function used to obfuscate the identifier. In some embodiments, a mapping table with the resource identifier values and corresponding obfuscated identifier values may be used to de-obfuscate the obfuscated identifier. An obfuscation algorithm and de-obfuscation algorithm are inverses of each other where performing an obfuscation operation O( ) on an identifier X produces an obfuscated identifier O(X) and performing a de-obfuscation operation D on O(X) results in the original identifier X—that is, D(O(X))=X.

The cryptographic module 302 may make the (de-obfuscated) identifiers $ID_i$ and $ID_j$ available to the management service for completing the request. In the example illustrated in FIG. 3, the identifiers and the modified data files 316 and 318 provided by the client 314 are provided to the backend 308 that accesses the storage service 312 and persists the modifications to data files 316 and 318.

Figure 4:
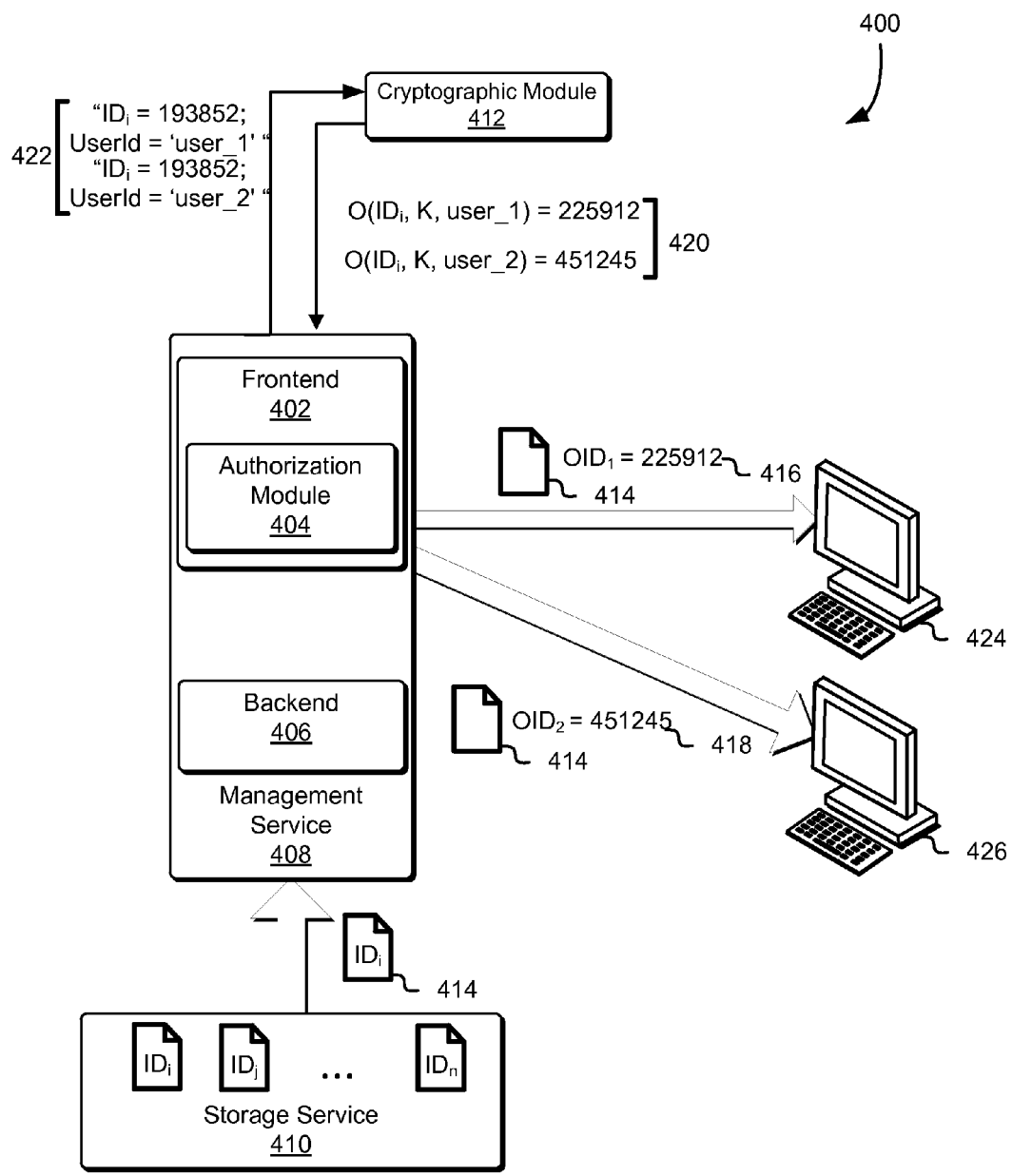
FIG. 4 illustrates an environment in which clients may receive different obfuscated identifiers for the same resource.

FIG. 4 illustrates an environment in which various embodiments can be implemented. The computing environment 400 illustrates a management service 412 configurable to obfuscate identifiers such that two clients 424 and 426 receive different obfuscated identifiers (416 and 418 respectively) for the same resource 414. The resource 414 may be a resource of the various resource types as described above in connection with the embodiment described in FIG. 2. In an embodiment, the management service 408 may be implemented in the manner described above in FIG. 1, and may include a service frontend 402 operable to receive and respond to requests, an authorization module 404, and a service backend for accessing resources such as the data files from a storage service 410. These components may be implemented in the manner described above in FIG. 1.

In some embodiments, the cryptographic module 412 uses a resource identifier and additional context 422 to obfuscate the resource identifier. For example, the additional context may be the user id of the client issuing a request. In some embodiments, the cryptographic module 412 may use the resource identifier as the plaintext input, the requestor's user id as an initialization vector or as a part as an initialization vector, and a cryptographic key. In an example, the resource identifier $ID_i$ is obfuscated to two different obfuscated identifier values 420 based at least in part on the requestors having different user IDs. The resource 414 and obfuscated identifier associated with the first client 416 is made available to the first client 424, whereas the resource 414 and the obfuscated identifier associated with the second client 418 is made available to the second client 426. In other embodiments, the cryptographic module 412 may use the resource identifier as the plaintext input, and a cryptographic key that is associated with the requestor. In this example, the obfuscated ID for a first client 424 and a second client 426 may be varied because different cryptographic keys are used for their respective obfuscation operations.

In some embodiments, the first client 424 and second client 426 may not have sufficient information between them to determine whether the first obfuscated identifier 416 and second obfuscated identifier 418 refer to the same resource, for example, where the resource is a snapshot or other type of resource wherein the resources themselves cannot be compared directly (e.g., where a bit-to-bit comparison of two resources cannot be used to determine whether two resources are identical).

Figure 5:
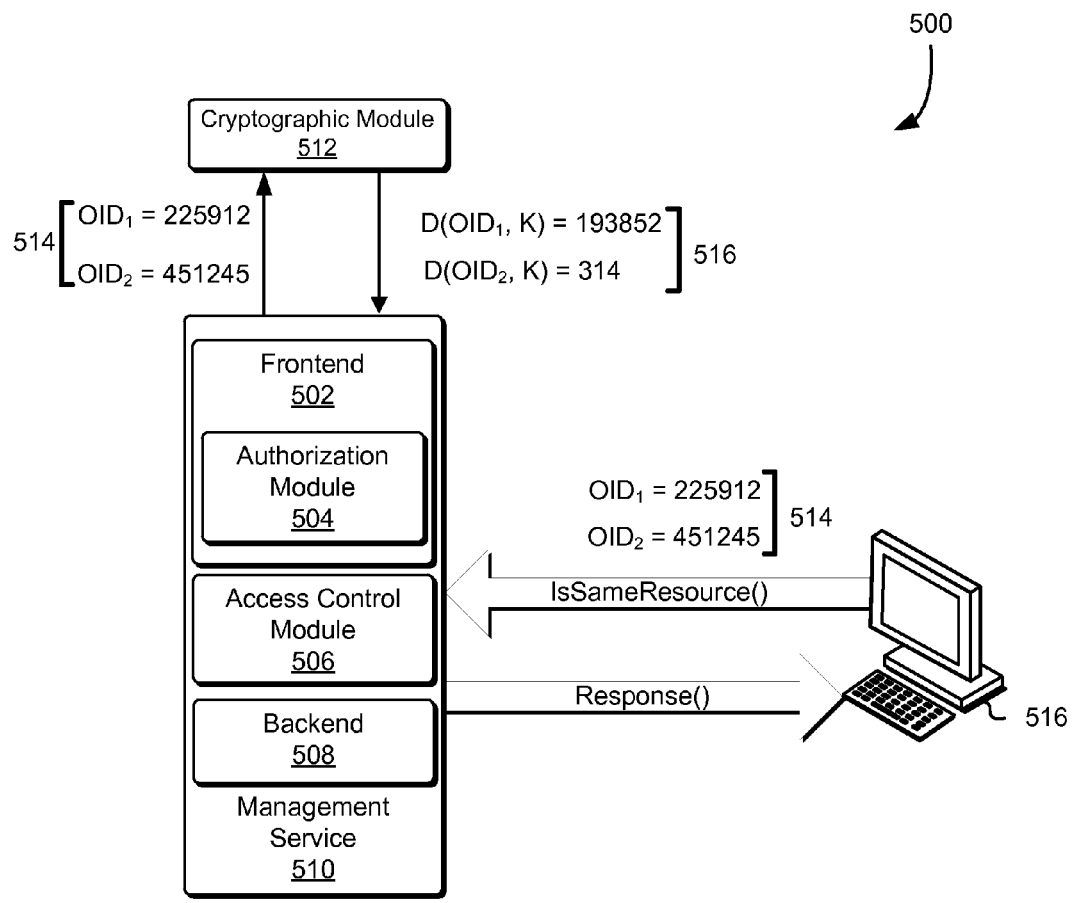
FIG. 5 illustrates an environment in which an access control module may be used to fulfill requests.

FIG. 5 illustrates an environment in which various embodiments can be implemented. The computing environment 500 illustrates a management service 512 configurable to obfuscate resource identifiers and de-obfuscate obfuscated identifiers and receive a request from a client 518 for information about the underlying resource that is not otherwise available based on the obfuscated identifiers. In an embodiment, the client issues a request inquiring whether the underlying resources associated with two obfuscated identifiers 514 are the same resource (e.g., a client has two snapshots with obfuscated identifiers $OID_1$ and $OID_2$ and wishes to determine whether it is the same snapshot). The service frontend 502 may receive the request and the authorization module may verify that the request is authentic.

In an embodiment, the obfuscated identifier 514 may be de-obfuscated by the cryptographic module 512, for example in the manner described in FIG. 3. The resource identifiers 516 may then be made available to the access control module 506 which determines how the request should be fulfilled. The access control module 506 may use the resource identifiers to determine whether the client 516 is sufficiently privileged. For example, client 518 may be the owner or administrator of the resources associated with the identifiers 516, and such status as the owner or administrator may entitle the client 518 to fulfillment of the request. Conversely, a second client (not shown in FIG. 5) that is neither the owner nor administrator of the resources associated with the identifiers 516 may be denied fulfillment of its request to know whether the obfuscated identifiers are associated with the same underlying resource.

The access control module 506 may be implemented as software, hardware, or a combination thereof. For example, the access control module may include a software component within the management service 510 for receiving requests and determining how fulfillment should proceed. The access control module may further include a hardware component storing a set of policies for determining fulfillment rules that the software component within the management service 510 uses to retrieve policies applicable to determining how fulfillment should proceed. For example, fulfillment rules may be based on the resource being accessed, client information, request information, metadata associated with the resource (e.g., whether the client is the owner or creator of the resource), or any combination thereof. In some embodiments, the access control module 506 may deny fulfillment of a request based on the on the applicable policies.

Figure 6:
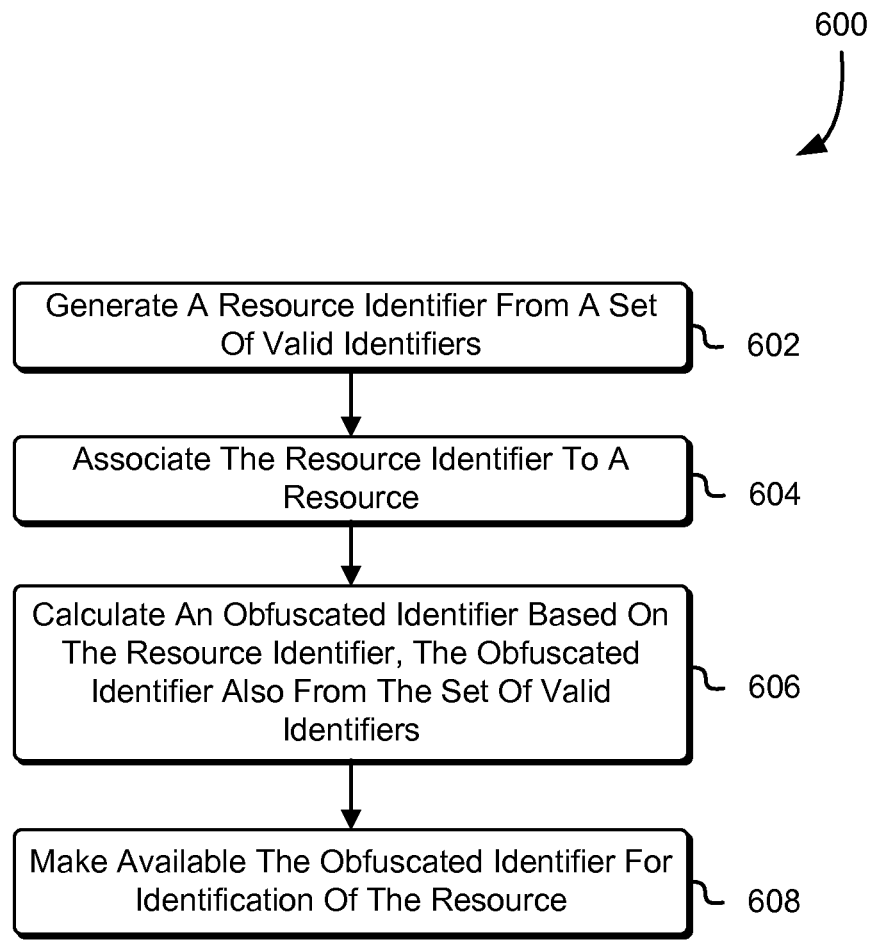
FIG. 6 is an illustrative process for generating obfuscated identifiers associated with a resource.

FIG. 6 describes an illustrative example of a process 600 for generating and making available an obfuscated identifier. The process 600 may be performed by any suitable system, such as by the system described in FIG. 1. The process may be performed, for example, in response to a request from a client to create a data file, create a user account, or run a computational task on a compute instance. In an embodiment, a resource identifier is generated from a set of valid identifiers 602. The resource identifier may be generated in any suitable manner, including by using an incrementing counter, or timestamp. The set of valid identifiers may, for example, have a maximum length (e.g., in bits or decimal digits), conform with specific numeric properties, or both (e.g., the set of valid identifiers may include valid 16-digit credit card numbers or a subset thereof). In an embodiment, resource identifiers may be generated by sequentially selecting identifiers for use (e.g., creation or assignment), using an offset to organize users into different categories (e.g., a first class of users may be given ID values sequentially from 1-9,999 and a second class of users may be given ID values sequentially from 10,000-99,999 and so on), assigning values using certain bits for flag values (e.g., ID values wherein the ID is composed of a 45-bit number where the high-order 5 bits are reserved for flags that may, in some examples, be used for specifying properties of the user, and the low-order 40 bits are sequentially assigned), and the like.

The resource identifier may be associated to the resource 604, for example, through an association table that records both the resource identifier and a reference to the resource or the resource itself. In other embodiments, the resource may include metadata that may be used to bind it to the identifier. An obfuscated identifier may be calculated based on the resource identifier, wherein the obfuscated identifier is also from the set of valid identifiers 606. The obfuscated identifier may be calculated using various ways. For example, a cryptographic module such as the cryptographic module of FIG. 1 may use an obfuscation algorithm based on AES-FFX to generate an obfuscated identifier that conforms to a maximum length requirement defining the set of valid identifiers. Finally, a component such as the service frontend of FIG. 1 may make available the obfuscated identifier for identification of the resource 608. In some embodiments, the resource or a reference operable to obtain the resource may also be made available with the obfuscated identifier.

Figure 7:
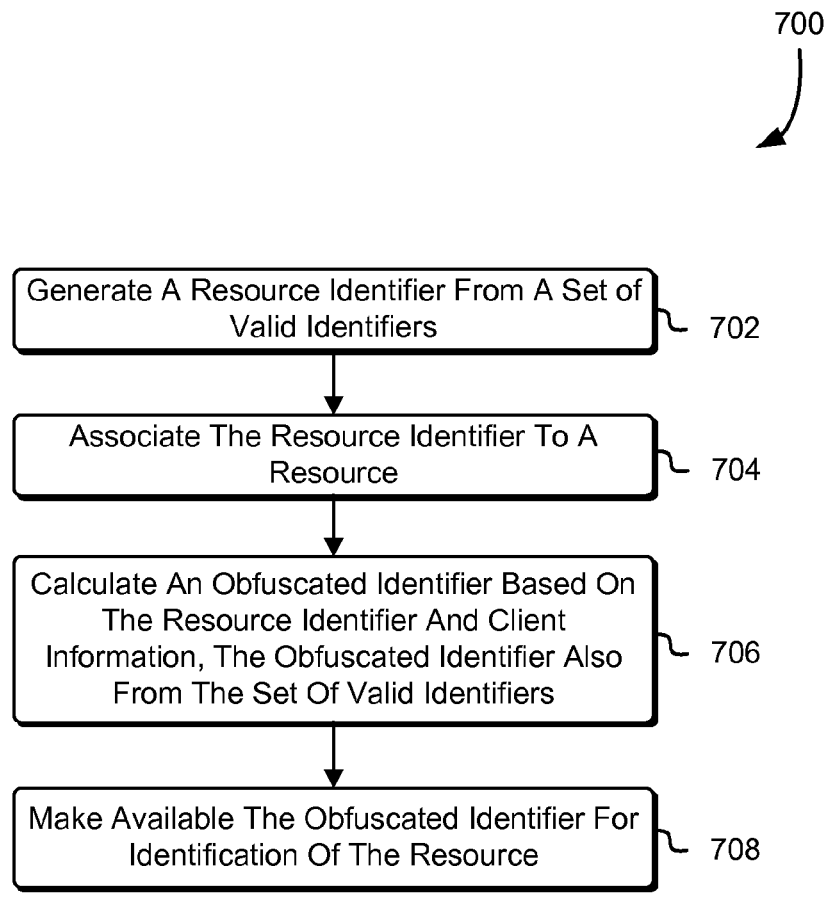
FIG. 7 is an illustrative process for generating obfuscated identifiers based on a resource and client information.

FIG. 7 describes an illustrative example of a process 700 for generating and making available an obfuscated identifier. The process 700 may be performed by any suitable system, such as by the system described in FIG. 4. The process may be performed, for example, in response to a request from a client to create a data file, create a user account, or run a computational task on a compute instance. In an embodiment, a resource identifier is generated from a set of valid identifiers 702. The resource identifier may be generated in any suitable manner, including by using an incrementing counter, or timestamp. The set of valid identifiers may, for example, have a maximum length (e.g., in bits or decimal digits), conform with specific numeric properties, or both (e.g., the set of valid identifiers may include valid 16-digit credit card numbers or a subset thereof). The resource identifier may then be associated to the resource 704, for example, through an association table that records both the resource identifier and a reference to the resource or the resource itself. In other embodiments, the resource may include metadata that may be used to bind it to the identifier. An obfuscated identifier may be calculated based on the resource identifier and client information, wherein the obfuscated identifier is also from the set of valid identifiers 706. Client information may be any information that is specific to an entity, such as a user ID, a password, or other information that is specific to a user, a client application, or other entity. The obfuscated identifier may be calculated using various obfuscation algorithms. For example, a cryptographic module such as the cryptographic module of FIG. 3 may use an obfuscation algorithm based on AES-FFX to generate an obfuscated identifier using a cryptographic key that is selected based on the client's user ID (e.g., having been generated using a key derivation function with the user ID as an input). The obfuscation algorithm may further generate identifiers conforming to a maximum length requirement defining the set of valid identifiers. Finally, a component such as the service frontend of FIG. 4 may make available the obfuscated identifier for identification of the resource 608. In some embodiments, the resource or a reference to obtain the resource may also be made available with the obfuscated identifier.

Figure 8:
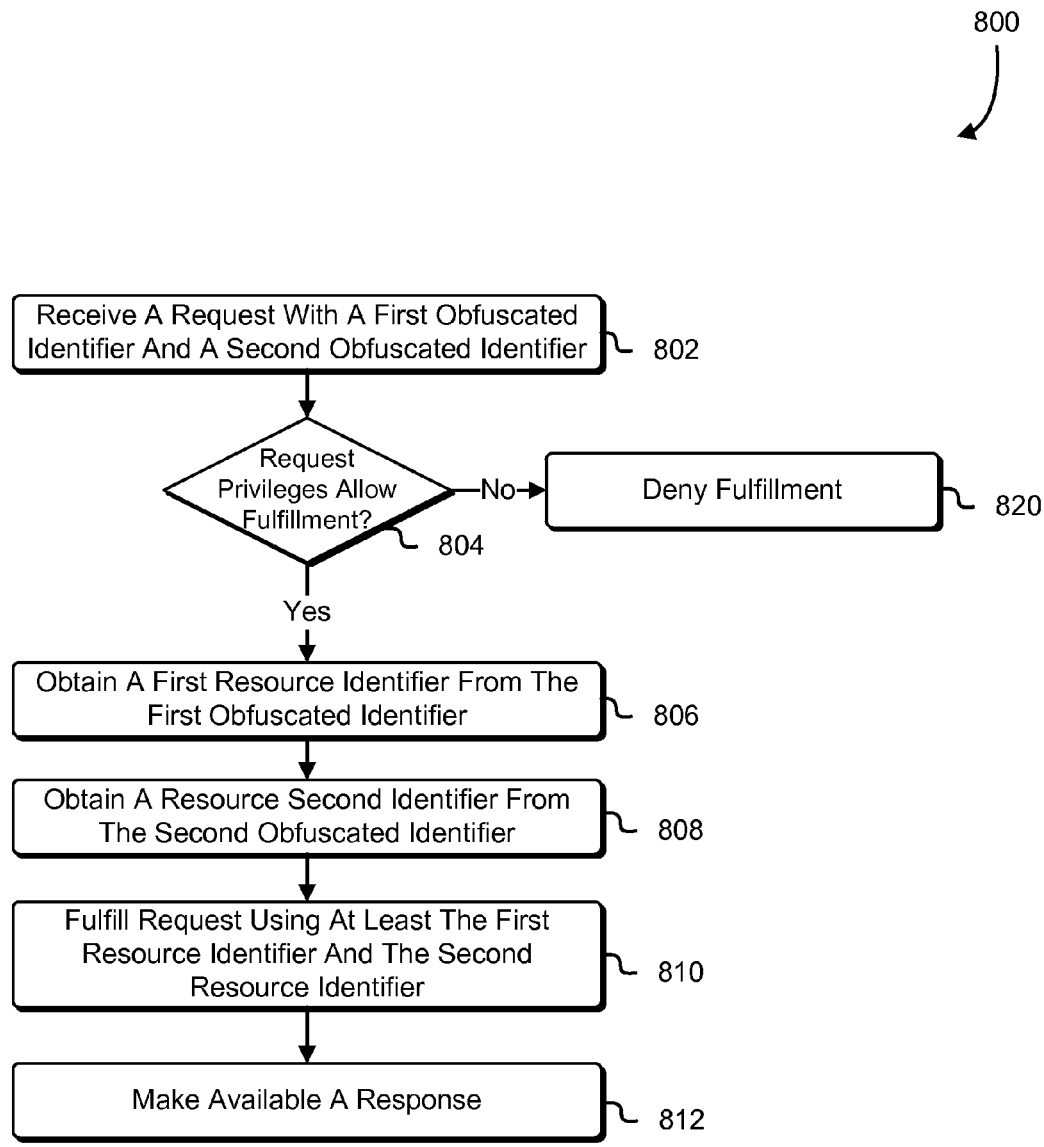
FIG. 8 is an illustrative process for fulfilling requests.

FIG. 8 describes an illustrative example of a process 800 for fulfillment of requests. The process 800 may be performed by any suitable system, such as by the system described in FIG. 5. The process may be performed, for example, in response to a request from a client that includes a first obfuscated identifier and a second obfuscated identifier. In an embodiment, a management service frontend may receive the request with the first obfuscated identifier and the second obfuscated identifier 802. The request, or information contained in the request, may be provided to an access control module, such as the access control module of FIG. 5, to determine whether the request privileges allow fulfillment 804. The request may be based on the identity of the requestor, or in some embodiments, may also be based on additional information contained in the request—for example, a requestor who is otherwise not privileged to allow fulfillment of the request may provide a security token that allows fulfillment of the request. If the access control module determines fulfillment is not allowed, the fulfillment of the request is denied 820. In some embodiments, the access control module may deny fulfillment of the response by issuing an error, executing a default routine, returning an error code, throwing an exception, or refusing to issue a response to the request (i.e., the request may timeout).

Where fulfillment of the request is allowed, a security module, for example, may be used to obtain a first resource identifier from the first obfuscated identifier 806 and obtain a second resource identifier form the second obfuscated identifier 808. The resource identifiers may be obtained in any suitable manner, including de-obfuscation in accordance with the embodiment described in FIG. 3.

The fulfillment of the request using at least the first resource identifier and the second resource identifier may be performed in any suitable manner, and may in some embodiments also require obtaining the resource associated with the first resource identifier, the second resource identifier, or both. However, in other embodiments, the underlying resources associated with the resource identifiers might not be accessed—for example, where the client requests to know whether the two obfuscated identifiers are associated to the same resource. Finally, the response may be made available 812, for example, to the client that issued the request.

In some embodiments, more than two obfuscated identifiers may be provided (e.g., a request to determine whether three obfuscated identifiers all are associated with the same resource). Similarly, a single obfuscated identifier may be provided in the request (e.g., a request to determine whether the resource associated with an obfuscated identifier is a specific type of resource).

Figure 9:
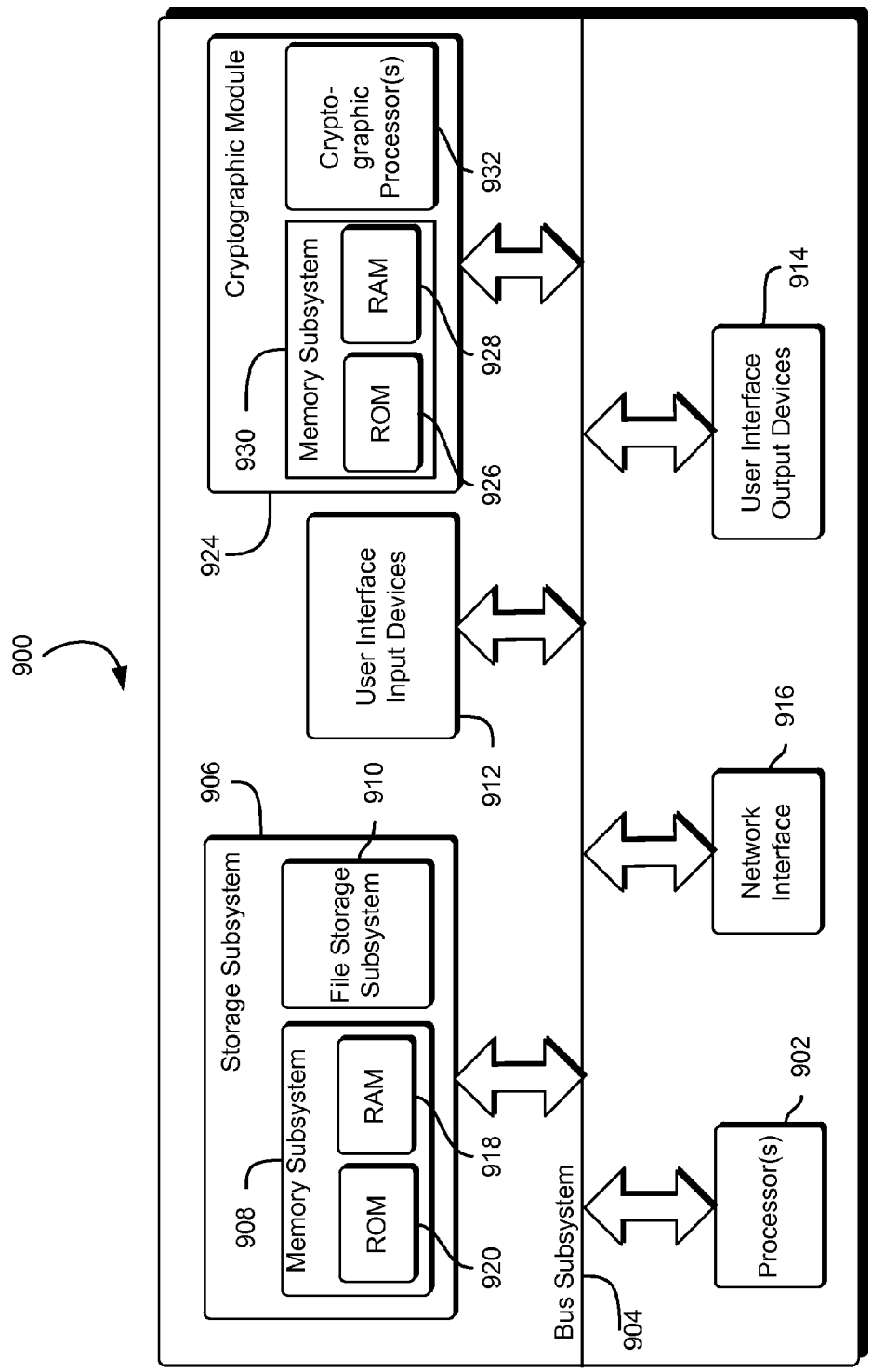
FIG. 9 illustrates an example computer system that may be configured to apply various techniques of the present disclosure.

FIG. 9 is an illustrative, simplified block diagram of an example computer system 900 that may be used to practice at least one embodiment of the present disclosure. In various embodiments, the computer system 900 may be used to implement any of the systems illustrated herein and described above. As shown in FIG. 9, the device 900 may include one or more processors 902 that may be configured to communicate with and are operatively coupled to a number of peripheral subsystems via a bus subsystem 904. These peripheral subsystems may include a storage subsystem 906, comprising a memory subsystem 908 and a file storage subsystem 910, one or more user interface input devices 912, one or more user interface output devices 914, a network interface subsystem 916, a cryptographic module 924, comprising a memory subsystem 930 and one or more cryptographic processors 932.

The bus subsystem 904 may provide a mechanism for enabling the various components and subsystems of computer system 900 to communicate with each other as intended. Although the bus subsystem 904 is shown schematically as a single bus, alternative embodiments of the bus subsystem may utilize multiple busses.

The network interface subsystem 916 may provide an interface to other computer systems and networks. The network interface subsystem 916 may serve as an interface for receiving data from and transmitting data to other systems from the computer system 900. For example, the network interface subsystem 916 may enable transmission of authentication objects and other information, such as electronic requests to access resources within a system (e.g., receive a data file). The network interface subsystem 916 may also facilitate the receipt and/or transmission of data on other networks, such as an organizations intranet and/or other networks described below.

The user interface input devices 912 may include one or more buttons, a keyboard, keypad, pointing devices, such as an integrated mouse, trackball, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Input devices may include, for instance, magnetic or other card readers, one or more USB interfaces, near field communications (NFC) devices/interfaces and other devices/interfaces usable to obtain data (e.g., long-term or short-term credentials) from other devices. In general, use of the term "input device" is intended to include all possible types of devices and mechanisms for inputting information to the computer system 900. In some embodiments, the computer system 900 may be configured to operate without user interface input devices 912—for example, servers on a server rack. In some embodiments, the computer system 900 may be configured such that a user interface input device 912 may be an optional component of the computer system 900—for example, an input device 912 may be removed from the computer system 900 during normal operations, but added if the computer system 900 is to be diagnosed by a technician or system administrator.

User interface output devices 914, if any, may include a display subsystem, a printer or non-visual displays, such as audio and/or tactile output devices, etc. Generally, the output devices 914 may invoke one or more of any of the five senses of a user. The display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 900. The output device(s) 914 may be used, for example, to present user interfaces including obfuscated identifiers to facilitate user interaction with applications performing processes described herein and variations therein, when such interaction may be appropriate. While a device 900 with user interface output devices is used for the purpose of illustration, it should be noted that the device 900 may operate without an output device, such as when the device 900 is operated in a server rack and, during typical operation, an output device is not needed.

The storage subsystem 906 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 906. These application modules or instructions may be executed by the one or more processors 902. The storage subsystem 906 may additionally provide a repository for storing data used in accordance with the present disclosure. The storage subsystem 906 may comprise a memory subsystem 908 and a file/disk storage subsystem 910.

The cryptographic module 924, which may be a trusted platform module (TPM), includes a memory subsystem 930, including a main random access memory (RAM) 928 for storage of instructions and data during program execution and a read only memory (ROM) 926, in which fixed cryptographic information may be stored, such as a hardware secret stored securely within the device 900 so as to be non-exportable (i.e., inaccessible through any call to the cryptographic module 924). The cryptographic module 924, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11889, which are incorporated herein by reference. The device 900 may also store cryptographic keys in RAM 928 and/or processor registers for temporary cryptographic processing. The cryptographic information stored in memory may be used in combination with cryptographic information obtained via the network interface 916 and/or one or more of the user interface input devices 912. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. The one or more cryptographic processors may further be configured to perform obfuscation and de-obfuscation algorithms described herein. Obfuscation and de-obfuscation algorithms may include various schemes for performing cryptographic operations on data including block ciphers, stream ciphers, and digital signature schemes. The cryptographic operations described herein may be implemented by software executing in the module, by hardware within the module, or a combination thereof. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CASTS, RC4 and the international data encryption algorithm (IDEA). Symmetric key algorithms may also include those used to generate output of one way functions and include, but are not limited to algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure.

As noted above, in various embodiments of the present disclosure, hardware secrets are securely stored within the cryptographic module 924. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs and/or other devices whose physical characteristics encode information usable as or for a hardware secret.

Figure 10:
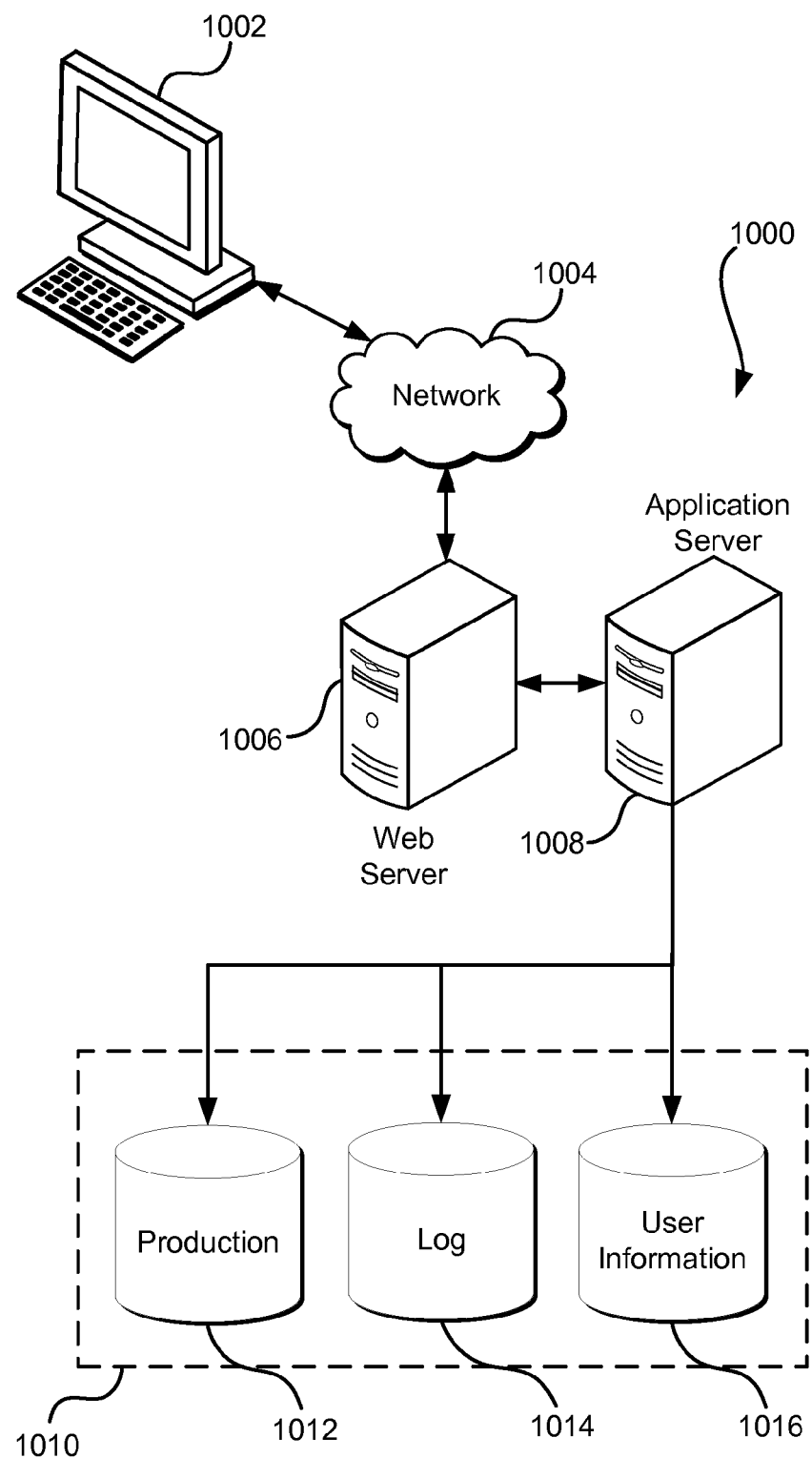
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for obfuscating resource identifiers, comprising:
    under the control of one or more computer systems configured with executable instructions,
        determining an identifier from a pre-defined set of valid identifier values;
        associating the identifier with a computing resource hosted in a distributed system of a service provider on behalf of a customer of the service provider, the computing resource being from a plurality of computing resources hosted by the service provider for different customers;
        generating an obfuscated identifier by at least encrypting the identifier using a symmetric key, wherein the encrypting includes constructing a block cipher using a Feistel network, the obfuscated identifier generated to:
            have a value within the pre-defined set of valid identifier values; and
            contain a human-readable tag denoting a resource type; and
        making available to the customer the obfuscated identifier for identification of the resource in the distributed system.

2. The computer-implemented method of claim 1, wherein:
the obfuscated identifier is a first obfuscated identifier; and
the method further comprises generating a second obfuscated identifier, wherein the generating of the second obfuscated identifier includes encrypting at least the identifier, wherein the encryption of at least the identifier includes:
the second obfuscated identifier is a value within the pre-defined set of valid identifier values; and
the second obfuscated identifier has a value different from the value of the first obfuscated identifier.

3. The computer-implemented method of claim 1, wherein the Feistel network is an unbalanced Feistel network.

4. The computer-implemented method of claim 1, wherein the pre-defined set of identifier values includes a value of greater than $2^{32}$ and does not include values greater than or equal to $2^{64}$.

5. A system, comprising:
at least one computing device that implements one or more services, wherein the one or more services:
determine an identifier from a pre-defined set of valid identifier values;
associate the identifier with a computing resource hosted in a distributed system of a service provider on behalf of a customer of the service provider, the computing resource being from a plurality of computing resources hosted by the service provider for different customers;
generate an obfuscated identifier by at least encrypting the identifier using a symmetric key, wherein the encrypting includes using a block cipher that utilizes a Feistel network, the obfuscated identifier generated to:
have a value within the pre-defined set of valid identifier values; and
contain a human-readable tag denoting a resource type; and
make available to the customer the obfuscated identifier for identification of the resource in the distributed system.

6. The system of claim 5, wherein the Feistel network is an unbalanced Feistel network.

7. The system of claim 6, wherein the identifier is selected from a set of identifiers having a maximum length that is different from an integer multiple of a block size of the block cipher.

8. The system of claim 5, wherein the computing resource is selected from the group consisting of compute instances, storage space, user accounts, and files.

9. The system of claim 5, wherein:
the obfuscated identifier is a first obfuscated identifier; and
the one or more services are further configured to:
generate a second obfuscated identifier using at least the block cipher applied to at least the identifier, the first obfuscated identifier having a different value from the value of the second obfuscated identifier; and
make available the generated second obfuscated identifier for identification of the computing resource.

10. The system of claim 5, wherein the one or more services are further configured to:
receive a request specifying the obfuscated identifier;
determine, based at least in part on the specified obfuscated identifier, the identifier; and
use the determined identifier to fulfill the received request.

11. The system of claim 5, wherein the system further includes an access control system, the access control system configured to:
receive a request from a requestor, the request having a first obfuscated identifier and a second obfuscated identifier;
determine that fulfillment of the request is allowed based at least in part on the requestor;
obtain a first resource identifier corresponding to the first obfuscated identifier;
obtain a second resource identifier corresponding to the second obfuscated identifier; and
fulfill the request using at least the first resource identifier and the second resource identifier.

12. The system of claim 5, wherein the one or more services are further configured to generate the obfuscated identifier by incorporating, into the obfuscated identifier, information associated with the computing resource in addition to the resource type.

13. A non-transitory computer-readable storage medium having stored thereon executable instructions that, as a result of execution by one or more processors of a computer system, cause the computer system to at least:
determine an identifier from a pre-defined set of valid identifier values;
associate the identifier with a computing resource hosted in a distributed system of a service provider on behalf of a customer of the service provider, the computing resource being from a plurality of computing resources hosted by the service provider for different customers;
generate an obfuscated identifier by at least encrypting the identifier using a symmetric key, wherein the encrypting includes using a block cipher that utilizes a Feistel network, the obfuscated identifier generated to:
have a value within the pre-defined set of valid identifier values; and
contain a human-readable tag denoting a resource type; and
make available to the customer the obfuscated identifier for identification of the resource in the distributed system.

14. The non-transitory computer-readable storage medium of claim 13, wherein the block cipher is format preserving.

15. The non-transitory computer-readable storage medium of claim 13, wherein the Feistel network is an unbalanced Feistel network.

16. The non-transitory computer-readable storage medium of claim 13, wherein the obfuscated identifier has a length in bits greater than 32 and a length in bits less than 64.

17. The non-transitory computer-readable storage medium of claim 13, wherein the encrypting is performed using an algorithm that is an inverse to a format-preserving decryption algorithm.

18. The non-transitory computer-readable storage medium of claim 13, wherein the instructions further comprise instructions that, when executed by the one or more processors, cause the computer system to:
use the block cipher to generate a second obfuscated identifier for the computing resource; and
make the second identifier available to identify the computing resource.

19. The non-transitory computer-readable storage medium of claim 18, wherein the instructions further comprise instructions that cause the computer system to generate the second identifier to be a member of a set defined, at least in part, by a maximum length.

20. The non-transitory computer-readable storage medium of claim 13, wherein the instructions, cause the computer system to at least:
- receive a request, from a requestor, that specifies the obfuscated identifier;
- obtain, using from the obfuscated identifier, the identifier;
- determine, based at least in part on the identifier obtained from the obfuscated identifier, that the computing resource corresponds to the identifier; and
- perform one or more operations in connection with the resource as part of fulfilling the request.

* * * * *